(12) United States Patent
Kato

(10) Patent No.: US 12,400,095 B2
(45) Date of Patent: Aug. 26, 2025

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Shingo Kato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 467 days.

(21) Appl. No.: 17/864,346

(22) Filed: Jul. 13, 2022

(65) Prior Publication Data

US 2023/0244889 A1 Aug. 3, 2023

(30) Foreign Application Priority Data

Jan. 28, 2022 (JP) ................................ 2022-012158

(51) Int. Cl.
*G06K 7/08* (2006.01)
*G06K 7/14* (2006.01)
(52) U.S. Cl.
CPC .................................. *G06K 7/1417* (2013.01)
(58) Field of Classification Search
CPC .................................................. G06K 7/1417
See application file for complete search history.

(56) References Cited

U.S. PATENT DOCUMENTS 5,506,697 A * 4/1996 Li ...................... H04N 1/00363
358/448
2017/0277926 A1* 9/2017 Yoshizaki .......... H04N 1/00334

FOREIGN PATENT DOCUMENTS

JP 3962759 8/2007

* cited by examiner

*Primary Examiner* — Ibrahim Siddo
(74) *Attorney, Agent, or Firm* — JCIPRNET

(57) ABSTRACT

An information processing apparatus includes: a processor configured to: in a case where a first page to which a first code including process information, which represents information for processing a document and in which at least another page other than the first page is set as a process target, is added and a second page to which a second code including process information, which represents information for processing a document and in which the second page is set as the process target, is added are captured, execute a process represented by the process information of the first code without executing a process represented by the process information of the second code in a case where the process represented by the process information of the first code conflicts with the process represented by the process information of the second code.

20 Claims, 11 Drawing Sheets

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2022-012158 filed Jan. 28, 2022.

BACKGROUND (i) Technical Field

The present invention relates to an information processing apparatus, a non-transitory computer readable medium storing an information processing program, and an information processing method.

(ii) Related Art

JP3962759B discloses a document processing apparatus that digitizes a block of documents including at least one document group configured with one or more documents, in which a code is printed or attached to at least a document at a head in the document group, the code includes an identification number for specifying the document group and attribute information which is information on a process to be executed on the digitized document, the attribute information includes information indicating a size of the document constituting the document group and information indicating a necessity of correction for an image related to the document, the document processing apparatus includes a document scanning section that acquires data of the digitized document and scans the code attached to the document, a processing content determination section that determines contents of the process to be executed on the digitized document in the document group based on the attribute information included in the scanned code, and an error status of the scanned document, and a document processing section that executes the determined process, and the processing content determination section includes a document group sorting unit that specifies a document group and sorts the digitized document for each document group based on the identification number, an error status determination unit that detects a size of the digitized document and determines that the document has an error in a case where the detected size and the size indicated by the attribute information are compared with each other and do not match, and a group processing determining unit that detects, in a case where the error status determination unit determines the error and the information included in the attribute information indicates that the correction is required, an inclination of the digitized document, determines, in a case where it is determined that the digitized document has no inclination, the process of correcting only the size of the document, and determines, in a case where it is determined that the digitized document has the inclination, the process of rotating and correcting the document.

SUMMARY

There is known a technique for capturing a document as image data by a scanning process and executing a process on the captured image data. Here, there is a section that preliminarily adds a physical code including process information representing the process, for example, a quick response (QR) code (registered trademark) to a page included in the document. In a case where the document is captured by the scan process, the process information is extracted from the QR code (registered trademark) added to the page, and the process represented by the process information is executed.

Meanwhile, the QR code (registered trademark) includes a QR code (registered trademark) (hereinafter, referred to as a "first code") in which a process target of the process information including the QR code (registered trademark) is a set of pages including at least other pages other than the page to which the QR code (registered trademark) is added, and a QR code (registered trademark) (hereinafter, referred to as a "second code") in which the process target of the process information including the QR code (registered trademark) is a page to which the QR code (registered trademark) is added.

Here, when a page to which the first code is added is captured and a process represented by process information included in the first code is executed on the subsequent page, a page to which the second code is added is captured, and a process represented by process information included in the second code is executed on the page to which the second code is added, in some cases. In a case where the process represented by the process information included in the first code and the process information included in the second code conflict with each other, for example, in a case where contents of the process is a process of storing image data in different storage destinations, a contradiction will occur and the process cannot be normally executed.

Aspects of non-limiting embodiments of the present disclosure relate to an information processing apparatus, a non-transitory computer readable medium storing an information processing program, and an information processing method that normally execute, even in a case where a page to which a first code is added and a page to which a second code is added are mixed and a process represented by process information included in the first code and a process represented by process information included in the second code conflicts with other, the processes.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processor configured to: in a case where a first page to which a first code including process information, which represents information for processing a document and in which at least another page other than the first page is set as a process target, is added and a second page to which a second code including process information, which represents information for processing a document and in which the second page is set as the process target, is added are captured, execute a process represented by the process information of the first code without executing a process represented by the process information of the second code in a case where the process represented by the process information of the first code conflicts with the process represented by the process information of the second code.

BRIEF DESCRIPTION OF THE DRAWINGS

Exemplary embodiment(s) of the present invention will be described in detail based on the following figures, wherein.

DETAILED DESCRIPTION

First Exemplary Embodiment

Figure 1:
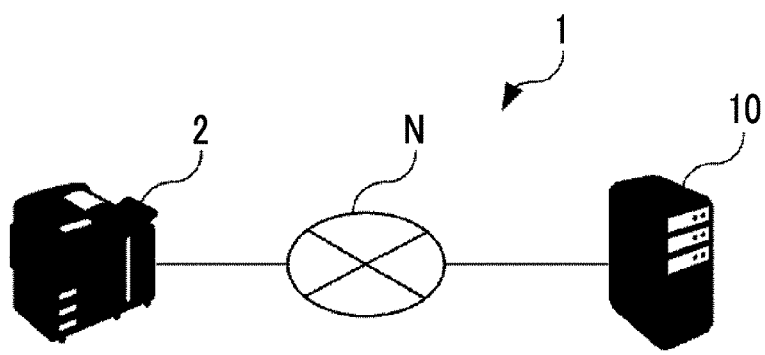
FIG. 1 is a schematic diagram illustrating an example of a configuration of an information processing system according to each exemplary embodiment.

Hereinafter, exemplary embodiments of the present invention will be described in detail with reference to the accompanying drawings. FIG. 1 is a schematic diagram illustrating an example of a configuration of an information processing system 1 according to the present exemplary embodiment.

As an example, as illustrated in FIG. 1, the information processing system 1 includes a multi-function device 2 having a scanner function and an information processing apparatus 10 which is a server. The multi-function device 2 and the information processing apparatus 10 are connected to each other via a network N. In the present exemplary embodiment, a mode in which the information processing apparatus 10 is a server will be described. Meanwhile, the exemplary embodiment is not limited thereto. The information processing apparatus 10 may be mounted on the multi-function device 2, or may be a terminal such as a personal computer.

The multi-function device 2 scans a document including one or a plurality of pages according to an instruction of a user, captures the document as image data, and transmits the image data to the information processing apparatus 10.

The information processing apparatus 10 acquires the image data from the multi-function device 2, and scans a quick response (QR) code (registered trademark) (hereinafter, referred to as a "code") added to the page included in the document from the acquired image data. According to information on a process to be performed on the document included in the code (hereinafter, referred to as "process information"), the information processing apparatus 10 has a function of executing the process. In the present exemplary embodiment, a mode in which a QR code (registered trademark) is added as the code will be described. Meanwhile, the exemplary embodiment is not limited thereto. The code may be a barcode (one-dimensional code), text information, a figure, or other information, as long as the process information can be recognized by the information processing apparatus 10.

The process information according to the present exemplary embodiment includes a storage destination for storing image data and a type of code (hereinafter, referred to as a "code type") indicating a process of capturing a target to be stored in the storage destination. The code type includes a "face sheet process" representing a process of capturing a set of pages using a face sheet, and an "individual process" representing a process of capturing a document individually for each page. In the following, a code indicating the face sheet process is referred to as a "face sheet code", and a code indicating the individual process is referred to as an "individual code". Here, the face sheet code is an example of a first code, and the individual code is an example of a second code.

In a case where a code type included in a code is a face sheet process, the information processing apparatus 10 executes the face sheet process of setting image data related to a page after a page from which the code is scanned as a target, and storing the image data of the set target in a storage destination included in process information. Further, in a case where the code type is an individual process, the information processing apparatus 10 executes the individual process of setting the image data related to the page from which the code is scanned as the target, and storing the image data of the set target in the storage destination included in the process information.

Figure 2:
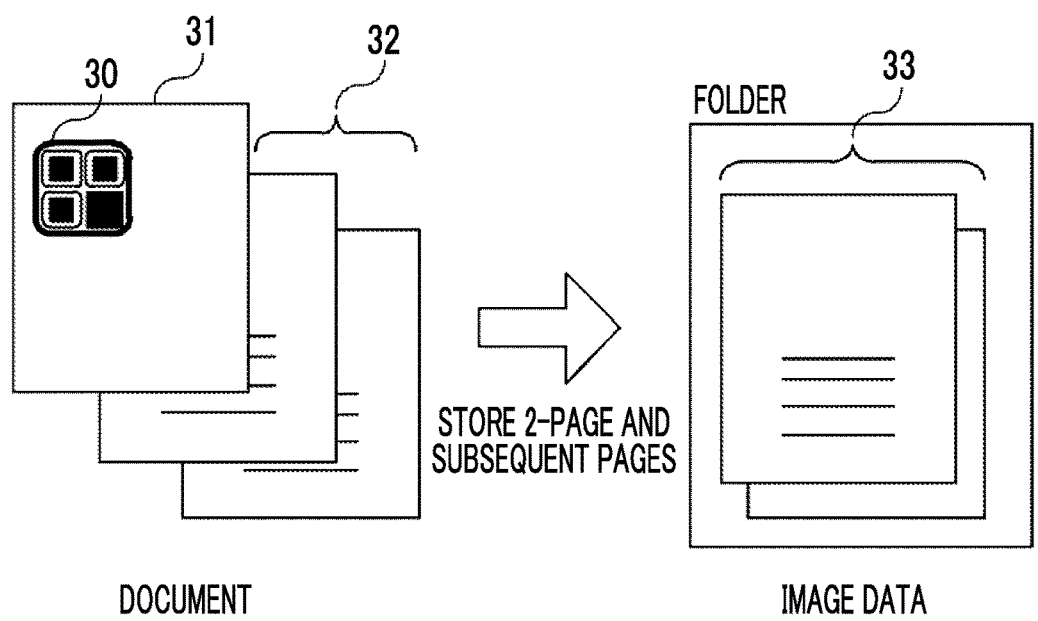
FIG. 2 is a schematic diagram illustrating an example of a capturing process on a document by using a code added to a face sheet according to each exemplary embodiment.

FIG. 2 is a schematic diagram illustrating an example of a face sheet process according to the present exemplary embodiment. The face sheet process is a process of storing, from a document including a face sheet 31 to which a face sheet code 30 is added at 1-page and pages 32 of 2-page and the subsequent pages as targets, image data 33 corresponding to the page 32 according to process information. Here, the face sheet 31 is an example of a first page.

Figure 3:
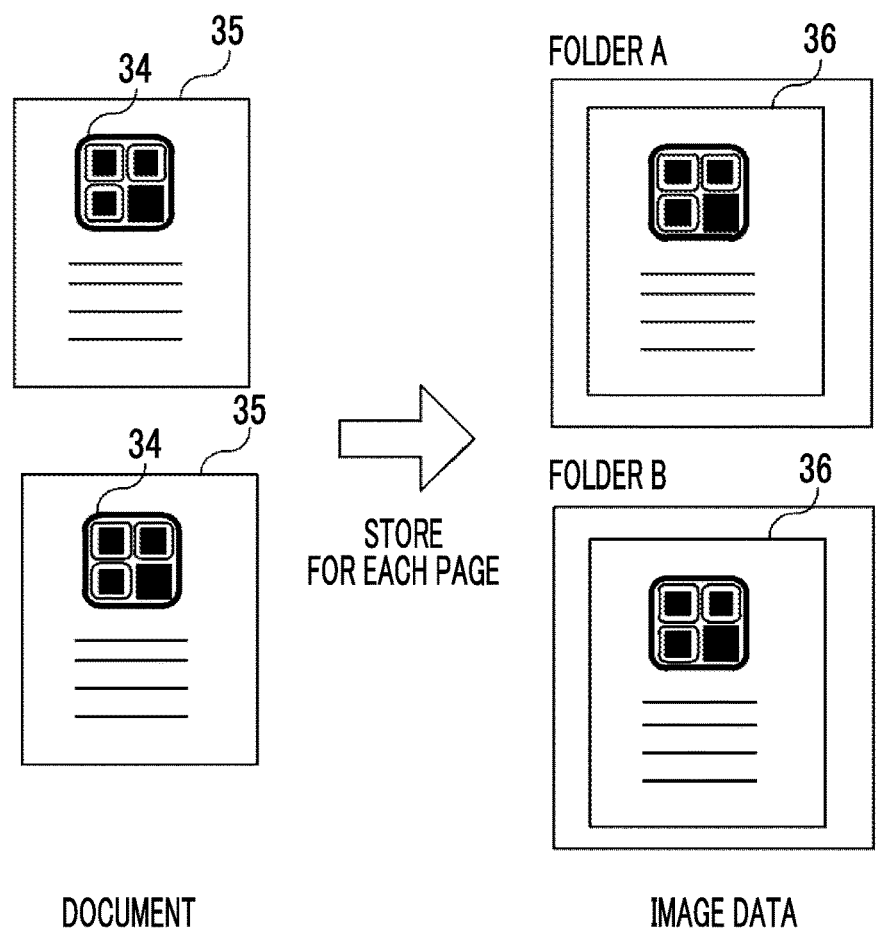
FIG. 3 is a schematic diagram illustrating an example of a capturing process on a document by using a code individually added to each page according to each exemplary embodiment.

Further, FIG. 3 is a schematic diagram illustrating an example of an individual process according to the present exemplary embodiment. The individual process is a process of storing, from a document including each page 35 to which an individual code 34 indicating the individual process is added, each image data 36 corresponding to the page 35 according to process information. Here, each page 35 to which the individual code 34 is added is an example of a second page.

In the present exemplary embodiment, a mode in which a plurality of documents including pages to which each of the face sheet code 30 and the individual code 34 is added are captured and corresponding image data is stored will be described.

Figure 4:
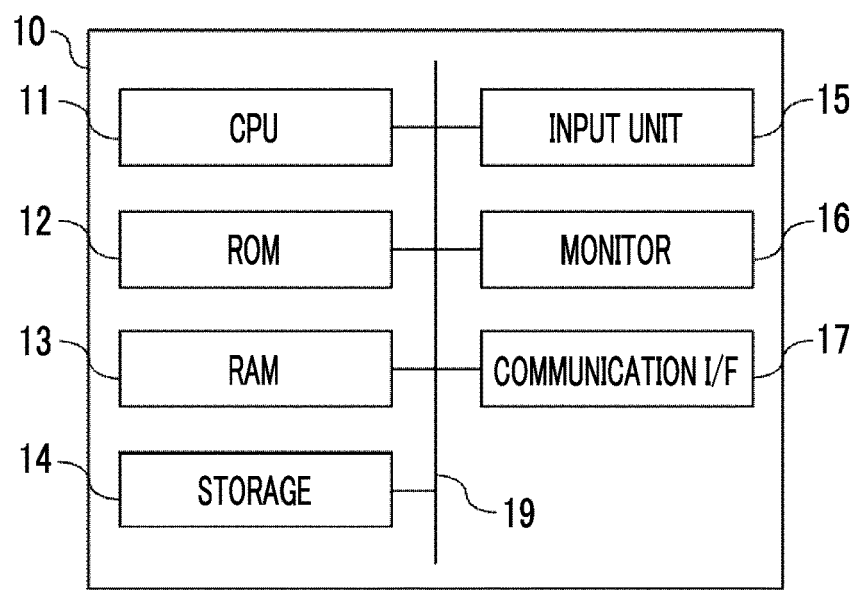
FIG. 4 is a block diagram illustrating an example of a hardware configuration of an information processing apparatus according to each exemplary embodiment.

Next, a hardware configuration of the information processing apparatus 10 will be described with reference to FIG. 4. FIG. 4 is a block diagram illustrating an example of the hardware configuration of the information processing apparatus 10 according to the present exemplary embodiment.

As illustrated in FIG. 4, the information processing apparatus 10 according to the present exemplary embodiment is configured to include a central processing unit (CPU) 11, a read only memory (ROM) 12, a random access memory (RAM) 13, a storage 14, an input unit 15, a monitor 16, and a communication interface (communication I/F) 17. The CPU 11, the ROM 12, the RAM 13, the storage 14, the input unit 15, the monitor 16, and the communication I/F 17 are connected to each other via a bus 19. Here, the CPU 11 is an example of a processor.

The CPU 11 collectively controls the entire information processing apparatus 10. The ROM 12 stores various programs including an information processing program, data, and the like used in the present exemplary embodiment. The RAM 13 is a memory used as a work area when executing various programs. The CPU 11 expands the program stored in the ROM 12 into the RAM 13 to execute the process of capturing the document.

The storage 14 is a hard disk drive (HDD), a solid state drive (SSD), a flash memory, or the like as an example. The input unit 15 is a touch panel, a keyboard, or the like that accepts a text input and a target selection. The monitor 16 displays texts and images. The communication I/F 17 transmits and receives data.

Figure 5:
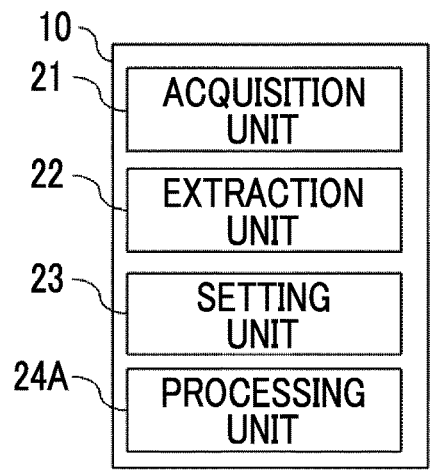
FIG. 5 is a block diagram illustrating an example of a functional configuration of an information processing apparatus according to a first exemplary embodiment.

Next, a functional configuration of the information processing apparatus 10 will be described with reference to FIG. 5. FIG. 5 is a block diagram illustrating an example of a functional configuration of the information processing apparatus 10 according to the present exemplary embodiment.

As an example, as illustrated in FIG. 5, the information processing apparatus 10 includes an acquisition unit 21, an extraction unit 22, a setting unit 23, and a processing unit 24A. In a case where the CPU 11 executes the information processing program to function as the acquisition unit 21, the extraction unit 22, the setting unit 23, and the processing unit 24A.

The acquisition unit 21 acquires image data from the multi-function device 2. Here, the acquired image data is image data obtained by capturing a plurality of documents including pages to which each of the face sheet code 30 representing the face sheet process and the individual code 34 representing the individual process is added.

The extraction unit 22 scans a code included in the image data, and extracts a code type set in the code and a storage destination of the image data, as process information.

The setting unit 23 sets the extracted process information in the information processing apparatus 10. Specifically, the setting unit 23 sets a target of the image data according to the extracted storage destination and the extracted code type.

For example, in a case where the code type is the face sheet process, the setting unit 23 sets the image data corresponding to a page after a page from which the code type is extracted as the target, and in a case where the code type is the individual process, the setting unit 23 sets the image data corresponding to the page from which the code is extracted as the target.

Further, in a case where process information on the face sheet process is already set as the setting of the information processing apparatus 10, the setting unit 23 does not set process information on the individual process as the setting of the information processing apparatus 10 even in a case where the code type indicating the individual process is extracted.

The processing unit 24A executes a process of storing the target image data in the set storage destination.

Next, before an action of the information processing apparatus 10 according to the present exemplary embodiment is described, a method of processing a document including a plurality of codes will be described with reference to FIGS. 6 to 10. FIGS. 6 to 10 are schematic diagrams illustrating an example of a process of capturing a plurality of documents according to the present exemplary embodiment.

Figure 6:
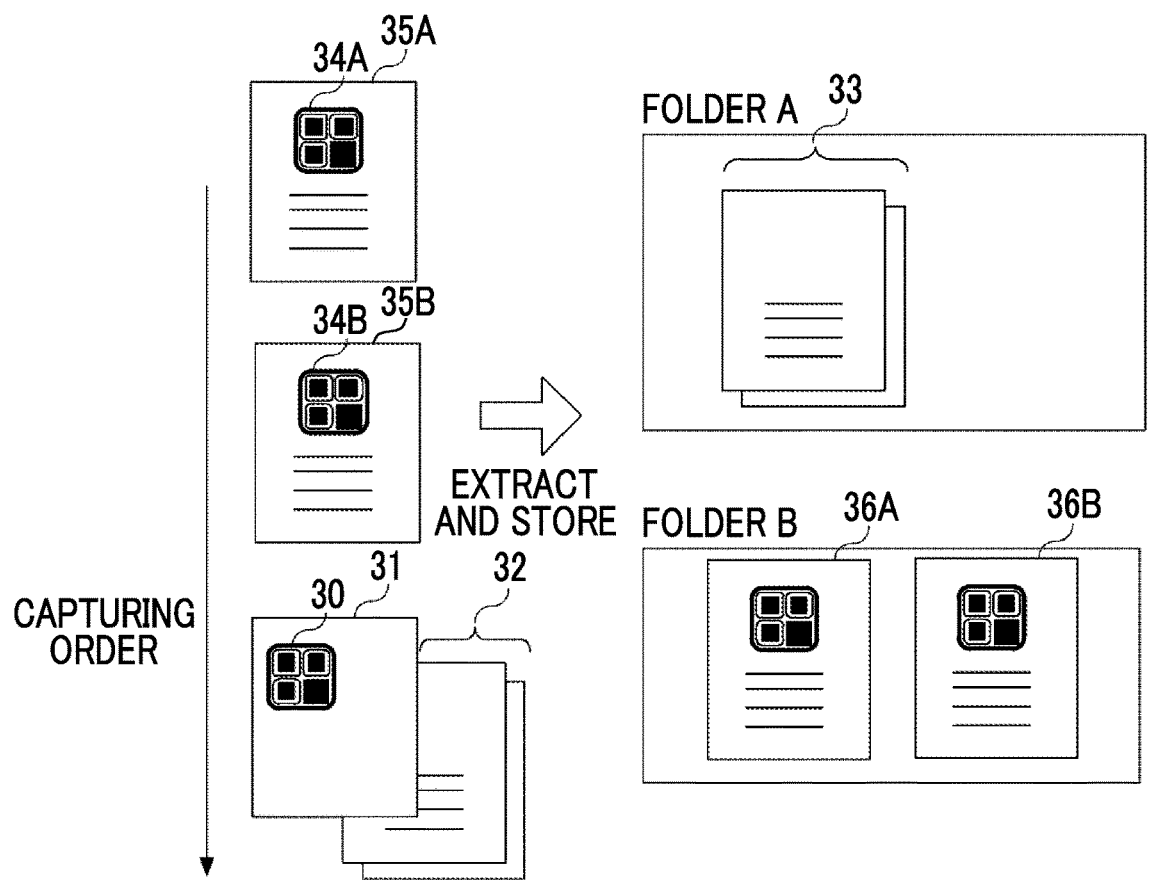
FIG. 6 is a schematic diagram illustrating an example of a process of capturing a plurality of documents according to each exemplary embodiment.
Figure 7:
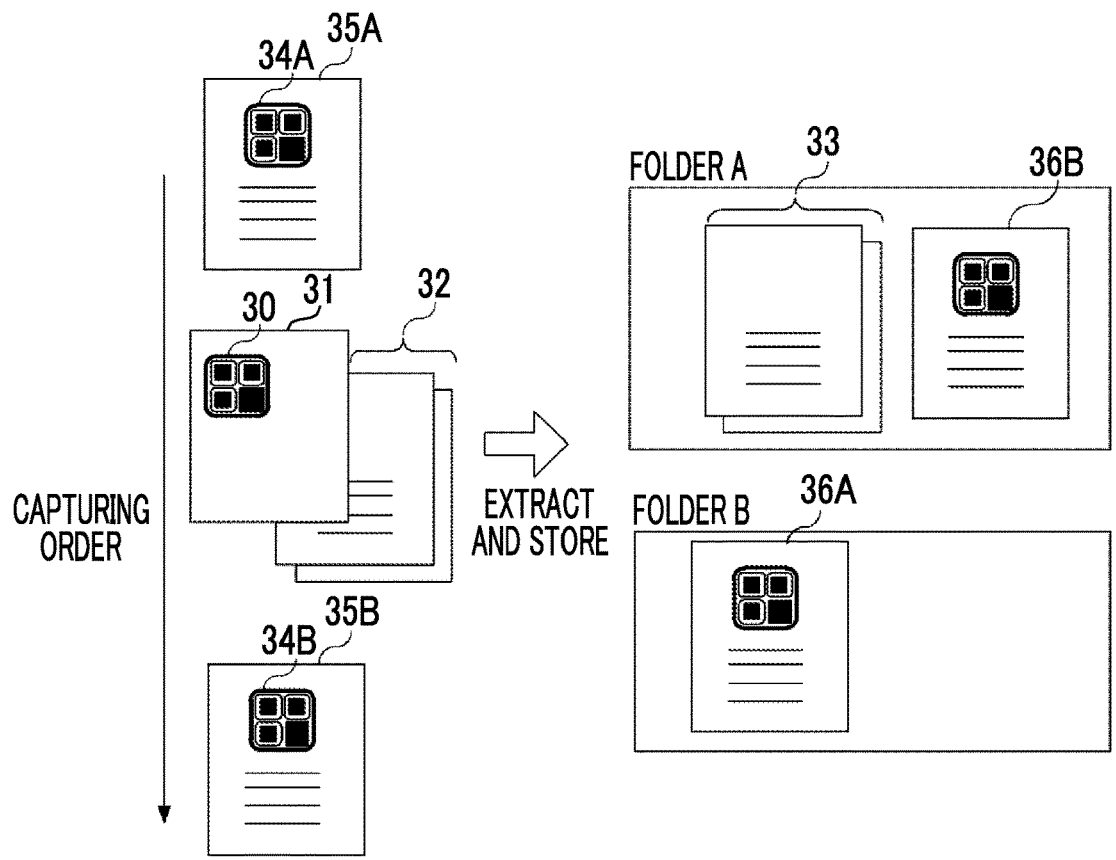
FIG. 7 is a schematic diagram illustrating another example of the process of capturing the plurality of documents according to each exemplary embodiment.
Figure 8:
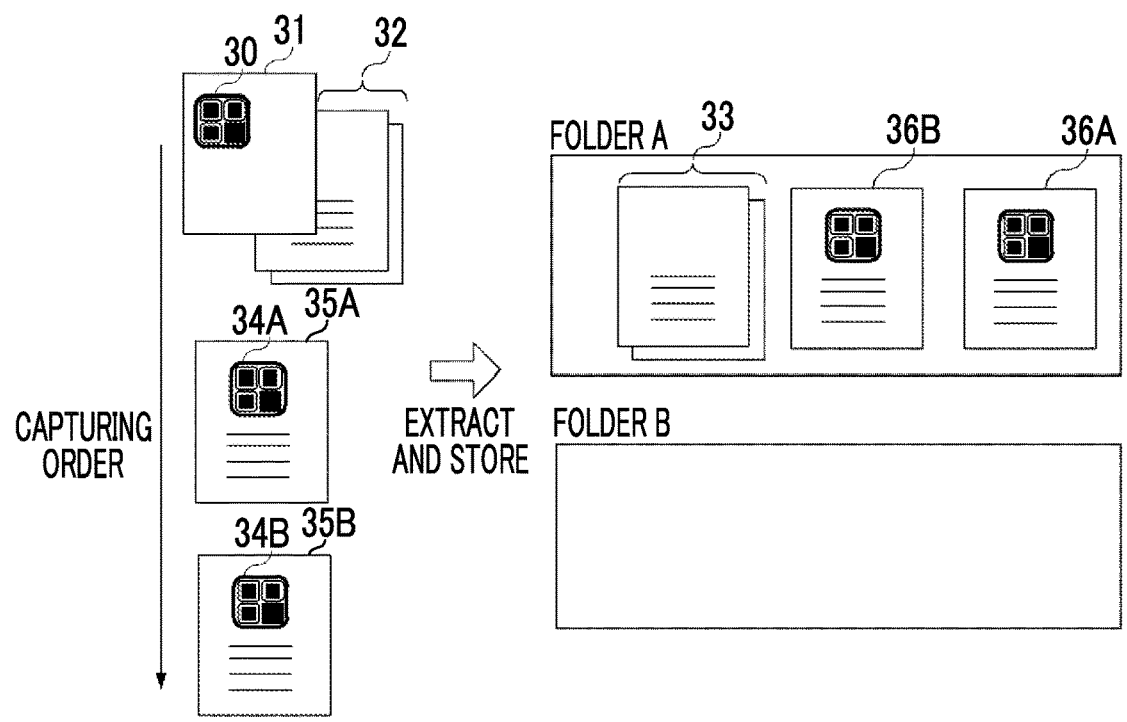
FIG. 8 is a schematic diagram illustrating still another example of the process of capturing the plurality of documents according to each exemplary embodiment.

The information processing apparatus 10 according to the present exemplary embodiment scans a code added to a page included in the document, and extracts a code type and a storage destination as process information. FIGS. 6 to 8 illustrate a mode for extracting a face sheet code 30 in which a folder A is set in a storage destination as process information, and individual codes 34A and 34B in which a folder B is set in a storage destination.

First, with reference to FIG. 6, a mode in which the documents are captured in an order of a page 35A to which the individual code 34A is added, a page 35B to which the individual code 34B is added, and a face sheet 31 to which the face sheet code 30 is added, as a capturing order will be described.

The information processing apparatus 10 extracts the individual code 34A from the page 35A, and stores image data 36A corresponding to the page 35A in the folder B, according to process information included in the individual code 34A. In the same manner, the information processing apparatus 10 extracts the individual code 34B from the page 35B, and stores image data 36B corresponding to the page 35B in the folder B, according to process information included in the individual code 34B. Further, in a case where the face sheet code 30 is extracted, the information processing apparatus 10 stores the image data 33 corresponding to the page 32 after the face sheet 31 in the folder A, according to process information included in the face sheet code 30.

Next, with reference to FIG. 7, a mode in which the documents are captured in an order of the page 35A to which the individual code 34A is added, the face sheet 31 to which the face sheet code 30 is added, and the page 35B to which the individual code 34B is added, as the capturing order will be described.

The information processing apparatus 10 extracts the individual code 34A from the page 35A, and stores image data 36A corresponding to the page 35A in the folder B, according to the process information included in the individual code 34A. In a case where the face sheet code 30 is extracted, the information processing apparatus 10 stores the image data 33 corresponding to the page 32 after the face sheet 31 in the folder A, according to the process information included in the face sheet code 30. Further, in a case where the individual code 34B is extracted after the face sheet code 30 is extracted, the information processing apparatus 10 does not set process information on the individual code 34B, and stores the image data 36B corresponding to the page 35B in the folder A already set in the information processing apparatus 10.

Next, with reference to FIG. 8, a mode in which the documents are captured in an order of the face sheet 31 to which the face sheet code 30 is added, the page 35A to which the individual code 34A is added, and the page 35B to which the individual code 34B is added, as the capturing order will be described.

In a case where the face sheet code 30 is extracted, the information processing apparatus 10 stores the image data 33 corresponding to the page 32 after the face sheet 31 in the folder A, according to the process information included in the face sheet code 30. In a case where the individual code 34A and the individual code 34B are extracted after the face sheet code 30 is extracted, the information processing apparatus 10 does not set process information on the individual code 34A and the individual code 34B. The information processing apparatus 10 respectively stores the image data 36A and the image data 36B corresponding to the page 35A and the page 35B in the folder A, according to process information on the face sheet code 30 already set in the information processing apparatus 10.

As illustrated in FIGS. 6 to 8, the information processing apparatus 10 sets the target and the storage destination according to the individual code by using the process information included in the extracted code until the face sheet code 30 is extracted. Then, the information processing apparatus 10 stores the target image data in the set storage destination.

For example, in a case where the individual code 34 is extracted before the face sheet code 30 is extracted, the information processing apparatus 10 sets the storage destination and the target included in the individual code 34 as the process information, and stores the image data 36 corresponding to the page 35, which is the target, in the set storage destination. In a case where the face sheet code 30 is extracted, the information processing apparatus 10 sets the storage destination and the target included in the face sheet code 30 as the process information, and stores the image data 33 corresponding to the page 32, which is the target, in the set storage destination. Even in a case where the individual code 34 is extracted after the face sheet code 30 is extracted, the information processing apparatus 10 does not set process information included in the individual code 34, and applies the setting related to the face sheet code 30 already set to perform the process.

Next, with reference to FIG. 9, a mode in which the documents are captured in an order of a face sheet 31A to which a face sheet code 30A is added and a face sheet 31B to which a face sheet code 30B is added, as the capturing order will be described. In the following, a mode for extracting the face sheet code 30A in which the folder A is set as a storage destination and the face sheet code 30B in which the folder B is set as the storage destination, as process information will be described.

The information processing apparatus 10 extracts the face sheet code 30A from the face sheet 31A, and stores the image data 33A corresponding to the page 32A in the folder A, according to process information included in the face sheet code 30A. The information processing apparatus 10 extracts the face sheet code 30A, then extracts the face sheet code 30B, and stores the image data 33B corresponding to a page 32B in the folder B, according to process information included in the face sheet code 30B.

Next, with reference to FIG. 10, a mode in which the documents are captured in an order of the page 35A to which the individual code 34A is added, the face sheet 31A to which the face sheet code 30A is added, the page 35B to which the individual code 34B is added, the face sheet 31B to which the face sheet code 30B is added, and a page 35C to which an individual code 34C is added, as the capturing order will be described. In the following, a mode in which the face sheet code 30A in which the folder A is set as a storage destination, the face sheet code 30B in which a folder C is set as the storage destination, and the individual code 34A, the individual code 34B, and the individual code 34C in which the folder B is set as the storage destination, as process information are extracted will be described.

The information processing apparatus 10 extracts the individual code 34A, and stores the image data 36A corresponding to the page 35A in the folder B, according to the process information.

Next, in a case where the face sheet code 30A is extracted, the information processing apparatus 10 stores the image data 33A corresponding to the page 32A after the face sheet 31A in the folder A, according to the process information included in the face sheet code 30. Further, in a case where the individual code 34B is extracted after the face sheet code 30A is extracted, the information processing apparatus 10 does not set process information on the individual code 34B, and stores the image data 36B corresponding to the page 35B in the folder A already set in the information processing apparatus 10.

Further, in a case where the face sheet code 30B is extracted after the face sheet code 30A is extracted, the information processing apparatus 10 stores the image data 33B corresponding to the page 32B in the folder C, according to the process information included in the face sheet code 30B. Further, in a case where the individual code 34C is extracted after the face sheet code 30B is extracted, the information processing apparatus 10 does not set process information on the individual code 34C, and stores image data 36C corresponding to the page 35C, in the folder C already set in the information processing apparatus 10.

Figure 9:
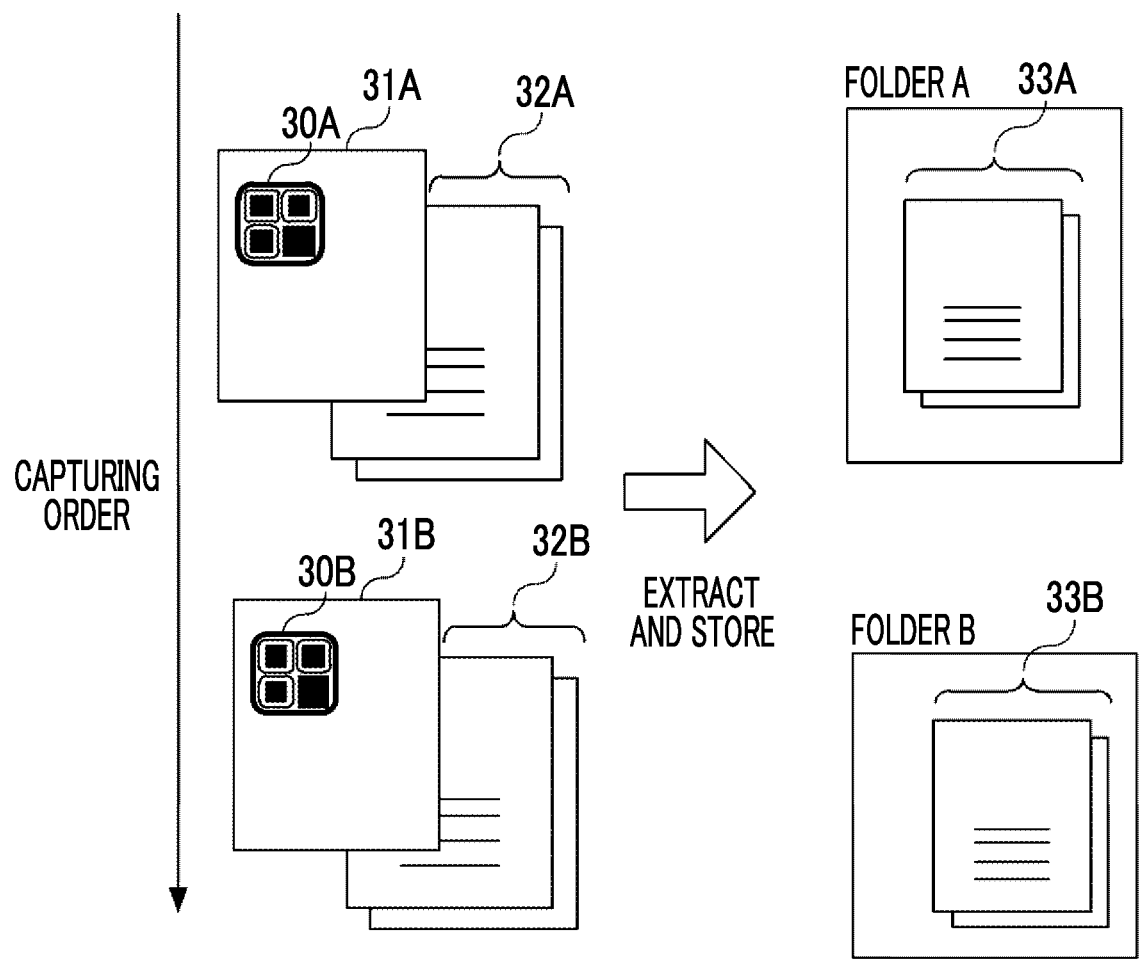
FIG. 9 is a schematic diagram illustrating still another example of the process of capturing the plurality of documents according to each exemplary embodiment.
Figure 10:
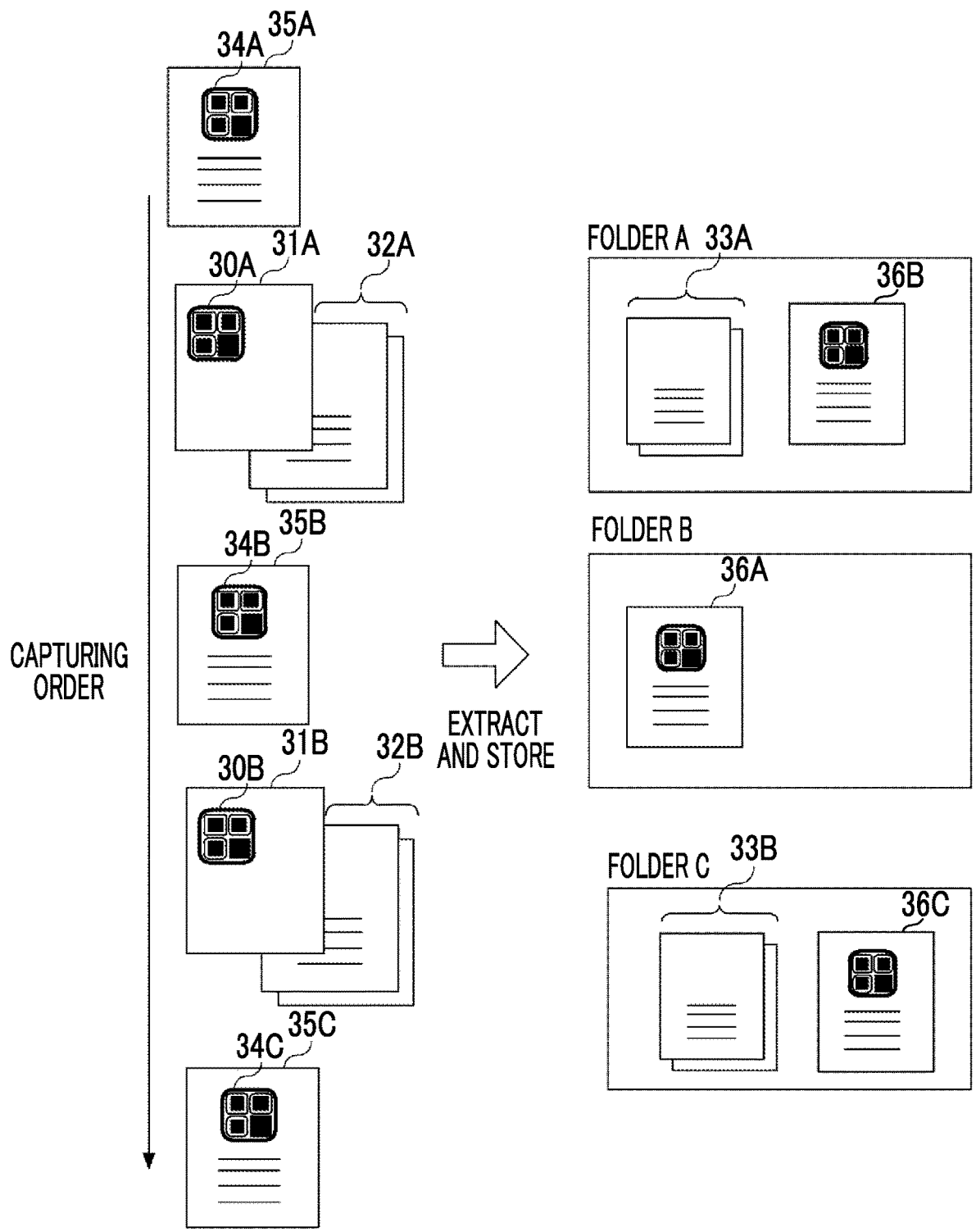
FIG. 10 is a schematic diagram illustrating still another example of the process of capturing the plurality of documents according to each exemplary embodiment.

As illustrated in FIGS. 9 and 10, in a case where a document includes a plurality of face sheets 31 to which the face sheet code 30 is added, the information processing apparatus 10 sets each of a storage destination and a target included in the face sheet code 30 as process information, and respectively stores the image data 33 in the set storage destination.

Here, a target related to the face sheet code 30A is from the page 32A after the face sheet 31A to a page before the face sheet 31B. A target of the face sheet code 30B is the page 32B after the face sheet 31B. For example, even in a case where the page 35 is included between the face sheet 31A and the face sheet 31B, the information processing apparatus 10 stores the image data 36 corresponding to the page 35, according to process information included in the face sheet 31A. Further, even in a case where the page 35C to which the individual code 34C is added is included after the face sheet 31B, the information processing apparatus 10 stores the image data 36C corresponding to the page 35C, according to process information included in the face sheet 31B.

Figure 11:
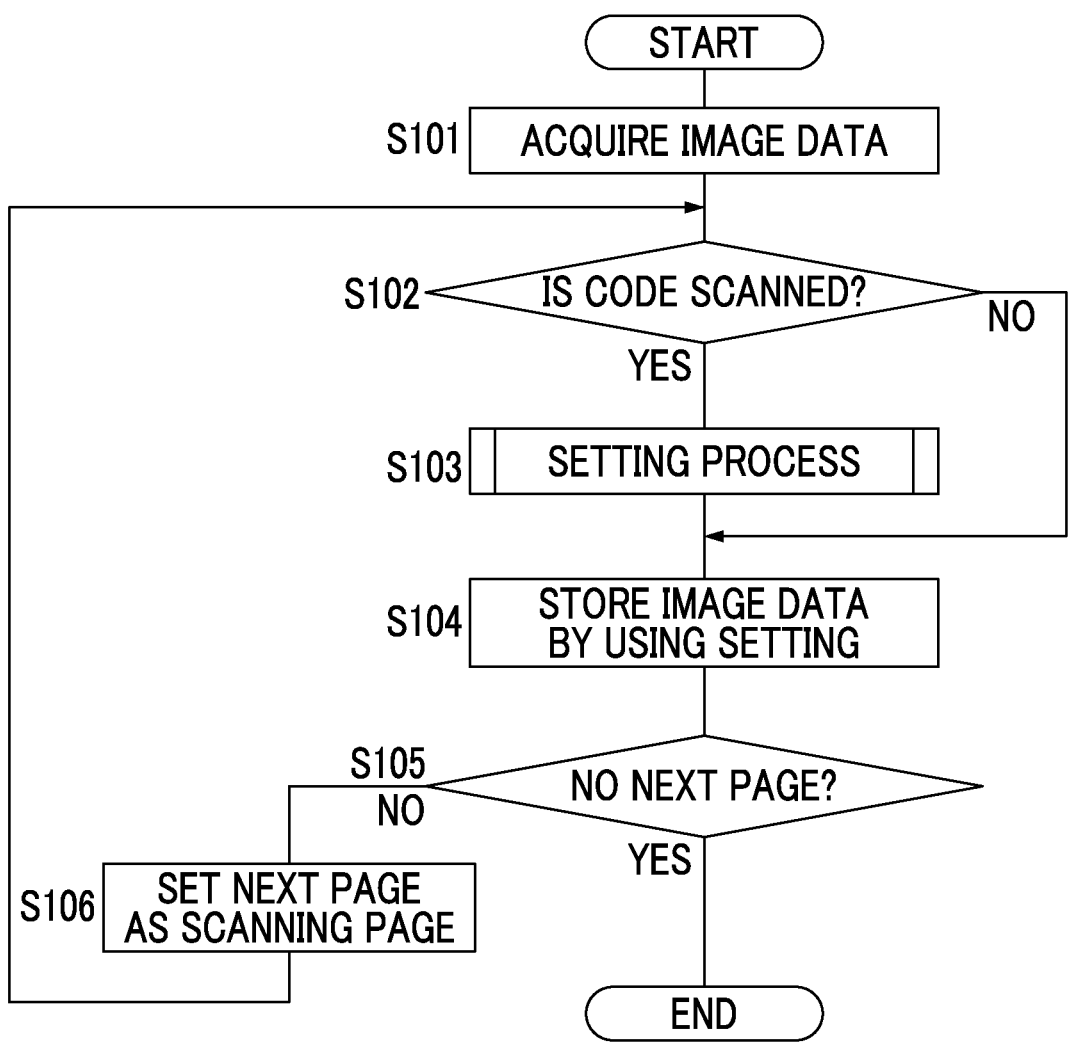
FIG. 11 is a flowchart illustrating an example of a document capturing process according to the first exemplary embodiment.
Figure 12:
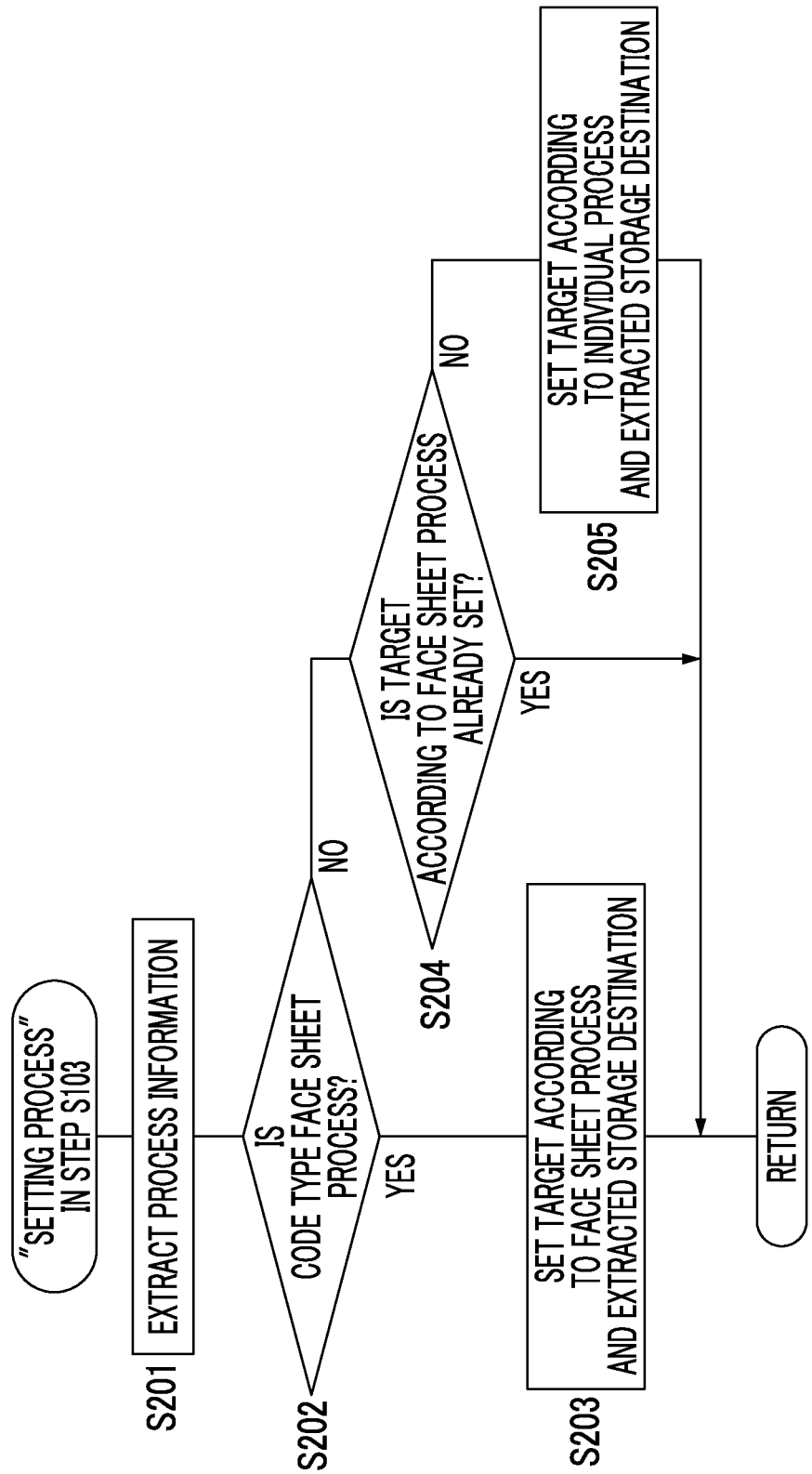
FIG. 12 is a flowchart illustrating an example of a process of setting a target and a storage destination according to the first exemplary embodiment.

Next, an action of the information processing apparatus 10 according to the present exemplary embodiment will be described with reference to FIGS. 11 and 12. FIG. 11 is a flowchart illustrating an example of a document capturing process according to the present exemplary embodiment. In a case where the CPU 11 reads an information processing program from the ROM 12 or the storage 14, and executes the information processing program to execute a document capturing process illustrated in FIG. 11. The document capturing process illustrated in FIG. 11 is executed, for example, in a case where an instruction to execute a process and image data are input from the multi-function device 2.

In step S101, the CPU 11 acquires image data from the multi-function device 2. Here, for the acquired image data, the CPU 11 sets 1-page of a document related to the image data as a scanning page for scanning a code.

In step S102, the CPU 11 determines whether or not the face sheet code 30 or a code indicating the individual code 34 is scanned from the scanning page. In a case where the code is scanned (YES in step S102), the CPU 11 proceeds to step S103. On the other hand, in a case where the code cannot be scanned from the scanning page (NO in step S102), the CPU 11 proceeds to step S104.

In step S103, the CPU 11 uses process information included in the scanned code to execute a setting process of setting a target and a storage destination according to the process information. The setting process will be described in detail in FIG. 12, which will be described below.

In step S104, the CPU 11 uses the target and the storage destination set in the information processing apparatus 10 to store the image data corresponding to the scanning page in the storage destination.

In step S105, the CPU 11 determines whether or not the next page exists in the document related to the acquired image data. In a case where the next page does not exist in the document related to the image data (YES in step S105), the CPU 11 ends the process of capturing the document. On the other hand, in a case where the next page exists in the image data (NO in step S105), the CPU 11 proceeds to step S106.

In step S106, the CPU 11 sets the next page to be scanned as the scanning page in the document related to the acquired image data.

Next, the setting process will be described with reference to FIG. 12. FIG. 12 is a flowchart illustrating an example of a process of setting a target and a storage destination according to the present exemplary embodiment. In a case where the CPU 11 reads a setting program from the ROM 12 or the storage 14, and executes the setting program to execute the setting process illustrated in FIG. 12. The setting process illustrated in FIG. 12 is executed, for example, in a case where a code added to a page included in a document is scanned.

In step S201, the CPU 11 extracts a code type and a storage destination from the code as process information.

In step S202, the CPU 11 determines whether or not the code type is a face sheet process. In a case where the code type is the face sheet process (YES in step S202), the CPU 11 proceeds to step S203. On the other hand, in a case where the code type is not the face sheet process (code type is an individual process) (NO in step S202), the CPU 11 proceeds to step S204.

In step S203, the CPU 11 sets the extracted target and the extracted storage destination according to the face sheet process, as a setting of the information processing apparatus 10.

In step S204, the CPU 11 determines whether or not the target according to the face sheet process is already set as the setting of the information processing apparatus 10. In a case where the target corresponding to the face sheet process is already set (YES in step S204), the CPU 11 ends the setting process without setting the extracted target and the extracted storage destination according to the individual process. On the other hand, in a case where the target according to the face sheet process is not set (NO in step S204), the CPU 11 proceeds to step S205.

In step S205, the CPU 11 sets the extracted target and the extracted storage destination according to the individual process, as the setting of the information processing apparatus 10.

As described above, according to the present exemplary embodiment, in a case where a page to which a first code is added and a page to which a second code is added are mixed, processes can be executed normally even in a case where the process represented by process information included in the first code and the process represented by process information included in the second code conflict with each other. With the above exemplary embodiment, the mode in which in a case where process information on a face sheet process is already set, process information on an individual process is not set as a setting of the information processing apparatus 10 even in a case where a code type indicating the individual process is extracted. Meanwhile, the exemplary embodiment is not limited thereto. In a case where it is determined that the process information on the face sheet process and the process information on the individual process information conflict with each other after the code type indicating the individual process is extracted and the process information on the individual process is set, the setting of the process information on individual process may be invalidated. As described above, the conflict of the process information means that the contents of the processes related to a plurality of pieces of process information do not hold at the same time.

Modification Example of First Exemplary Embodiment

In the present exemplary embodiment, the mode in which in a case where pieces of process information conflict with each other, such as indicating a different storage destination, the process information on a face sheet code is preferentially set is described. Meanwhile, the exemplary embodiment is not limited thereto. A priority order may be set for each process information included in a code, and the process information may be set according to the priority order.

For example, in a case where a higher priority order than process information on a face sheet code is set for process information on an individual code, even in a case where the individual code is scanned after the face sheet code is scanned, the information processing apparatus 10 sets the process information on the individual code to which the high priority is set to perform a process.

Further, in the present exemplary embodiment, the mode in which a code type and a storage destination are included as the process information is described. Meanwhile, the exemplary embodiment is not limited thereto. Other settings may be included. For example, other settings may include a setting such as an optical character recognition (OCR) process, a setting of attributes given to a document, and a folding setting for designating how to fold the document. In a case where the process information on the face sheet code and the process information on the individual code do not conflict with each other, other settings included in the process information of each code may be set as the setting of the information processing apparatus 10.

For example, in the process information, the storage destination and the setting of the OCR process do not conflict with each other. Therefore, even in a case where the individual code including the OCR process setting as the process information is scanned after the face sheet code including the storage destination as the process information is scanned, the information processing apparatus 10 may apply the setting of the OCR process related to the process information extracted from the individual code to execute the process. In addition, by providing a priority order for each setting, and by applying the setting related to process information extracted from an individual code according to the priority order, whether or not a process related to other settings is executed may be determined and the process may be executed.

Second Exemplary Embodiment

In the first exemplary embodiment, the mode of executing a process of storing the corresponding image data according to the process information included in the extracted code is described. In the present exemplary embodiment, a mode of presenting to a user a process to be executed according to the process information included in the extracted code will be described.

A configuration of an information processing system (see FIG. 1), a process related to a face sheet code (see FIG. 2), a process related to an individual code (see FIG. 3), and a hardware configuration of the information processing apparatus 10 (see FIG. 4) according to the present exemplary embodiment have the same manner as the first exemplary embodiment, so the description thereof will be omitted. Further, a schematic diagram (see FIGS. 6 to 10) illustrating a process of capturing a plurality of documents and a flowchart illustrating a flow of a setting process (see FIG. 12) according to the present exemplary embodiment have the same manner as the first exemplary embodiment, so the description thereof will be omitted.

Figure 13:
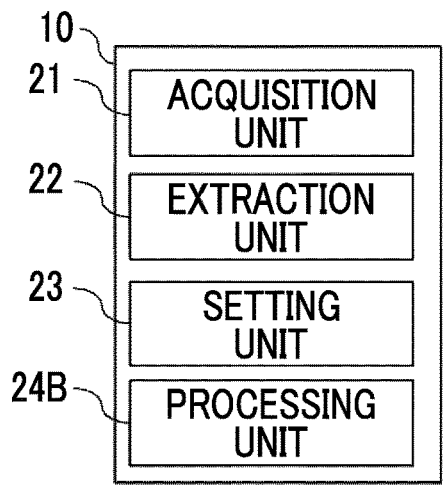
FIG. 13 is a block diagram illustrating an example of a functional configuration of an information processing apparatus according to a second exemplary embodiment.

A functional configuration of the information processing apparatus 10 will be described with reference to FIG. 13. FIG. 13 is a block diagram illustrating an example of a functional configuration of the information processing apparatus 10 according to the present exemplary embodiment. In FIG. 13, the identical functions as the functional configuration illustrated in FIG. 4 are denoted by the identical reference numerals with the reference numerals in FIG. 4, and the description thereof will be omitted.

As an example, as illustrated in FIG. 13, the information processing apparatus 10 includes the acquisition unit 21, the extraction unit 22, the setting unit 23, and the processing unit 24B. In a case where the CPU 11 executes the information processing program to function as the acquisition unit 21, the extraction unit 22, the setting unit 23, and the processing unit 24B.

The processing unit 24B associates target image data with a set storage destination by using a setting in the information processing apparatus 10, and presents the associated image data and storage destination to the user. The processing unit 24B performs a process of storing the associated image data in the storage destination according to an instruction of the user.

In addition, the processing unit 24B accepts selection of the user from the presented image data, and performs a process of displaying a preview of the selected image data.

Figure 14:
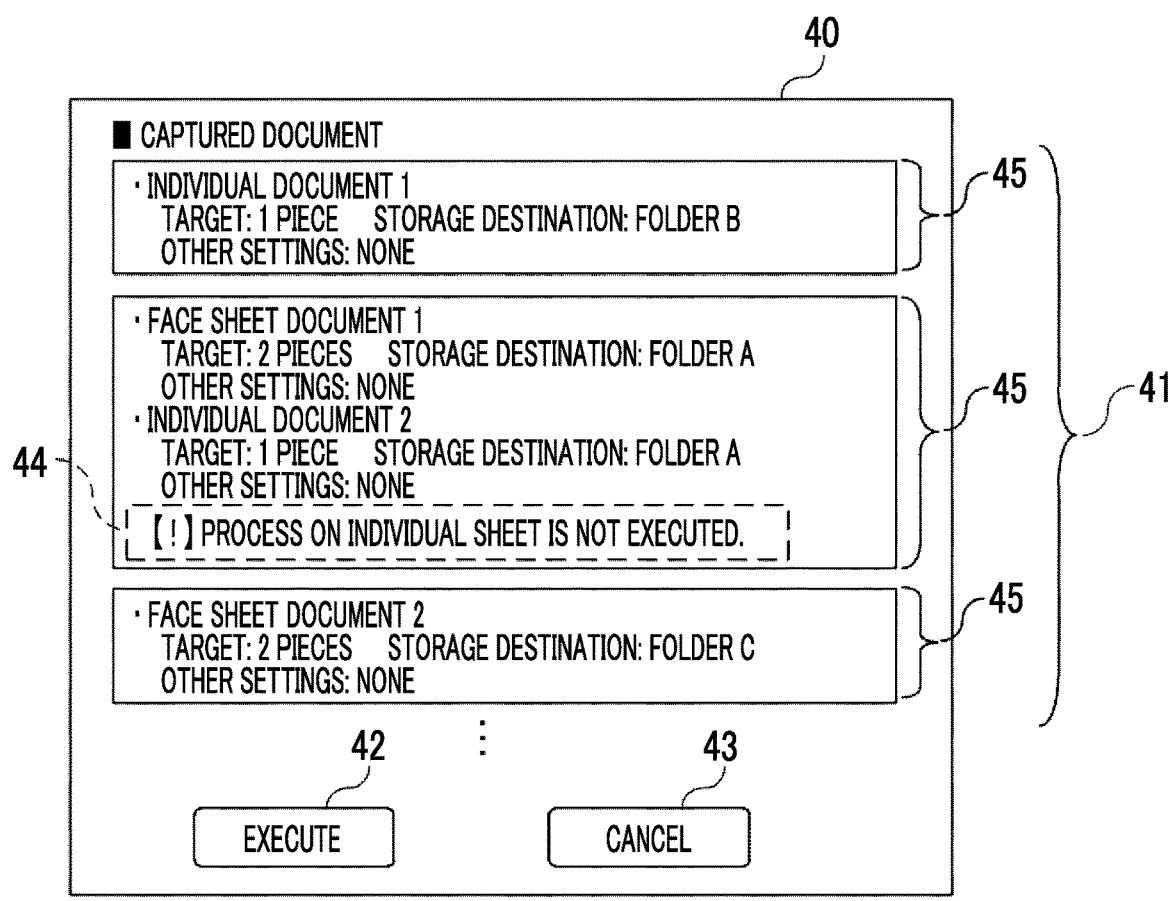
FIG. 14 is a schematic diagram illustrating an example of a captured document display screen according to the second exemplary embodiment.

As an example, as illustrated in FIG. 14, the processing unit 24B displays a captured document display screen 40 to present document information on associated image data and storage destination to the user. Here, the captured document display screen 40 includes a captured result display region 41, an execute button 42, and a cancel button 43. The captured result display region 41 is a region for displaying the document information on the associated image data and storage destination according to the extracted code by capturing a document. Further, the captured result display region 41 includes a target display region 45 that is classified and displayed for each document to be processed. Since the target display region 45 classifies the document for each process to be executed, it is possible to easily recognize which process is executed for the document and which process is executed to be included in the process.

The execute button 42 accepts an instruction to execute the subsequent process by being pressed by the user. The subsequent process is a process of storing the image data in the storage destination, according to the associated image data and storage destination. The cancel button 43 accepts an instruction not to execute the subsequent process by being pressed by the user.

As illustrated in FIG. 14, in a case where a document including a plurality of codes is captured, the captured document display screen 40 displays a target, a storage destination, and other settings related to each document in the captured result display region 41. In a case where a document including the face sheet code 30 and the individual code 34 is captured, and processes conflict with each other and image data is stored in a storage destination different from the storage destination included in the code, the captured document display screen 40 displays that the process corresponding to the code is not executed. For example, the captured document display screen 40 displays a text string 44 indicating that a process corresponding to a code is not executed on a target document is stored in a storage destination different from the storage destination included in the code, in the captured result display region 41.

Further, in the present exemplary embodiment, regarding the process displayed on the captured document display screen 40 illustrated in FIG. 14, the mode in which the process corresponding to a face sheet code of a face sheet document 1 is executed on an individual document 2, so that the process corresponding to an individual code of the individual document 2 is not executed is described. Meanwhile, the exemplary embodiment is not limited thereto. In a case where the process corresponding to the individual code cannot be executed as a result of executing the process corresponding to the face sheet code, as a process different from the process corresponding to the individual code, an alternative process of the process corresponding to the individual code may be proposed and controlled to be executed. For example, as the process corresponding to the individual code, a shortcut to the image data corresponding to the individual document 2 stored in the folder B or stored in the folder A is stored in the folder B. Further, in a case where the other setting is that a process corresponding to the face sheet code is a process of converting the document to a predetermined file format A and a process corresponding to the individual code is a process of converting the document to a predetermined file format B, and it is determined that these processes conflict with each other, only the process of converting to the predetermined file format A, which is the process corresponding to the face sheet code, is executed. In such a case, as a different process of substituting the process corresponding to the individual code, a process of duplicating image data corresponding to the document and converting the image data into the predetermined file format B may be executed.

The captured document display screen 40 accepts selection of the document information displayed in the captured result display region 41, and displays a preview of the image data related to the selected document information.

Figure 15:
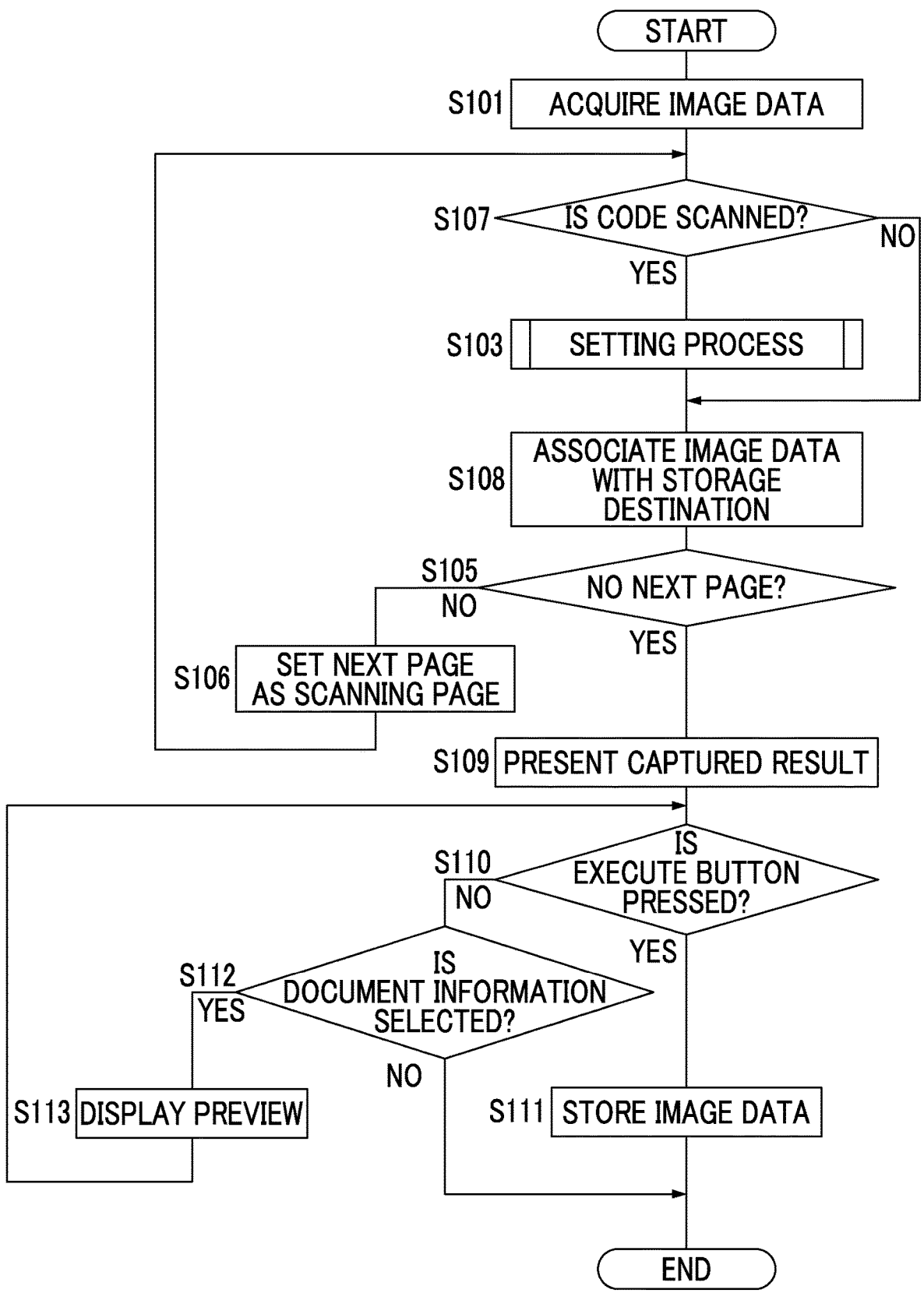
FIG. 15 is a flowchart illustrating an example of a capturing process on a document according to the second exemplary embodiment.

Next, an action of the information processing apparatus 10 according to the present exemplary embodiment will be described with reference to FIG. 15. FIG. 15 is a flowchart illustrating an example of a document capturing process according to the present exemplary embodiment. In a case where the CPU 11 reads an information processing program from the ROM 12 or the storage 14, and executes the information processing program to execute a document capturing process illustrated in FIG. 15. The document capturing process illustrated in FIG. 15 is executed, for example, in a case where an instruction to execute a process and image data are input from the multi-function device 2. In FIG. 15, the identical steps as the document capturing process illustrated in FIG. 11 are denoted by the identical reference numerals with the reference numerals in FIG. 11, and description thereof will not be repeated.

In step S107, the CPU 11 determines whether or not the face sheet code 30 or a code indicating the individual code 34 is scanned from the scanning page. In a case where the code is scanned (YES in step S107), the CPU 11 proceeds to step S103. On the other hand, in a case where the code cannot be scanned from the scanning page (NO in step S107), the CPU 11 proceeds to step S108.

In step S108, the CPU 11 uses the target and the storage destination set in the information processing apparatus 10 to store the image data corresponding to the scanning page and the storage destination in association with each other. Here, in a case where the individual code 34 is extracted after the face sheet code 30 is extracted, the text string 44 indicating that the process corresponding to the code is not executed is further associated and stored, for the page 35 (document) to which the individual code 34 is added.

In step S109, the CPU 11 displays the captured document display screen 40, and presents the captured result.

In step S110, the CPU 11 determines whether or not the execute button 42 is pressed on the captured document display screen 40. In a case where the execute button 42 is pressed (YES in step S110), the CPU 11 proceeds to step S111. On the other hand, in a case where the execute button 42 is not pressed (NO in step S110), the CPU 11 proceeds to step S112.

In step S111, the CPU 11 stores the image data in the associated storage destination.

In step S112, the CPU 11 determines whether or not document information is selected on the captured document display screen 40. In a case where the document information is selected (YES in step S112), the CPU 11 proceeds to step S113. On the other hand, in a case where the document information is not selected (the cancel button 43 is pressed) (NO in step S112), the CPU 11 ends the process.

In step S113, the CPU 11 displays a preview of the image data related to the selected document information.

As described above, according to the present exemplary embodiment, in a case where a page to which a first code is added and a page to which a second code is added are mixed, the user can recognize that the process represented by process information included in the first code and the process represented by process information included in the second code conflict with each other.

Modification Example of Second Exemplary Embodiment

Figure 16:
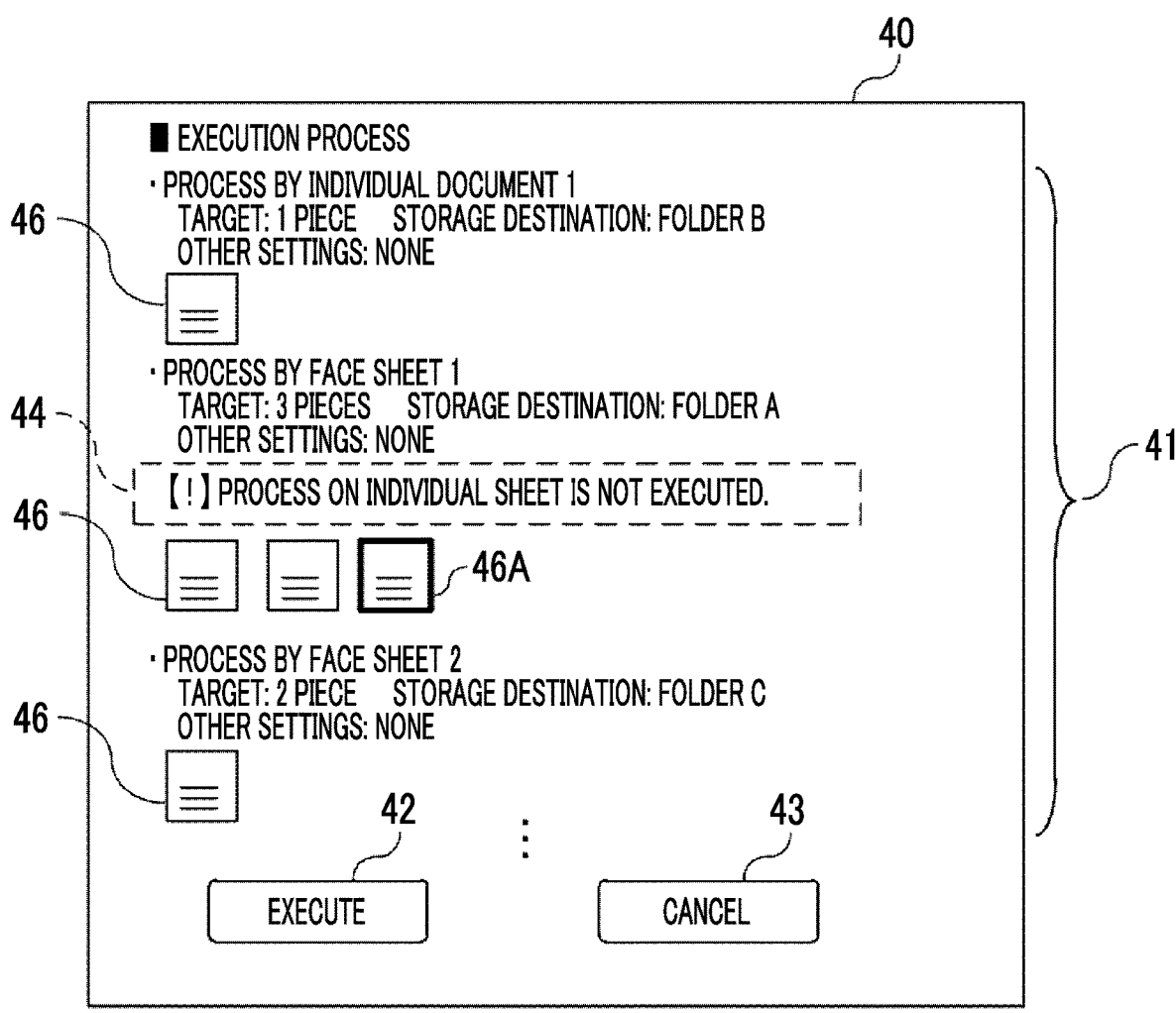
FIG. 16 is a schematic diagram illustrating an example of a captured document display screen according to a modification example of the second exemplary embodiment.

The captured result display region 41 according to the present exemplary embodiment is described as the mode in which the documents are classified and displayed for each document. Meanwhile, the exemplary embodiment is not limited thereto. The documents may be classified and displayed for each process to be executed. For example, as illustrated in FIG. 16, the captured result display region 41 may display the image data corresponding to the process target, the storage destination, the other settings, and the captured page applied for each process represented by the extracted process information. In addition, the captured result display region 41 may display a thumbnail 46 corresponding to the image data on which the process is executed. Further, in a case where a process different from the process included in the code is executed on the image data, the thumbnail 46 related to the image data may be highlighted, in the captured result display region 41. Specifically, in FIG. 16, in a case where a document to which a "process by face sheet 1" is associated includes a document to which an individual code is added, image data related to the document to which the individual code is added may be highlighted and displayed as a thumbnail 46A.

Although the exemplary embodiment of the invention is described by using each of the exemplary embodiments, the exemplary embodiment of the invention is not limited to the scope described in each of the exemplary embodiments. Various modifications or improvements can be added to each of the exemplary embodiments without departing from the gist of the present exemplary embodiment of the invention and the modified or improved form is also included in the technical scope of the present exemplary embodiment of the invention.

In the present exemplary embodiment, the mode of accepting an instruction as to whether or not to execute a subsequent process is described. Meanwhile, the exemplary embodiment is not limited thereto. An instruction as to whether or not to capture each document as image data may be accepted.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the present exemplary embodiment, the mode in which the information processing program is installed in the storage is described, and the present exemplary embodiment is not limited thereto. The information processing program according to the present exemplary embodiment also may be provided as a mode of being recorded in a computer readable storage medium. For example, the information processing program according to the exemplary embodiment of the present invention may be provided in a mode of being recorded on an optical disc such as a compact disc (CD)-ROM and a digital versatile disc (DVD)-ROM. The information processing program according to the exemplary embodiment of the present invention may be provided in a mode of being recorded in a semiconductor memory such as a Universal Serial Bus (USB) memory and a memory card. Further, the information processing program according to the present exemplary embodiment may be acquired from an external apparatus via a communication line connected to a communication I/F.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
in a case where a first page to which a first code including process information, which represents information for processing a document and in which at least another page other than the first page is set as a process target, is added and a second page to which a second code including process information, which represents information for processing a document and in which the second page is set as the process target, is added are captured, execute a process represented by the process information of the first code without executing a process represented by the process information of the second code in a case where the process represented by the process information of the first code conflicts with the process represented by the process information of the second code.

2. The information processing apparatus according to claim 1, wherein the processor is configured to:
in a case where the process represented by the process information of the first code does not conflict with the process represented by the process information of the second code, execute each process represented by the process information on each corresponding process target.

3. The information processing apparatus according to claim 1, wherein the processor is configured to:
in a case where the second code is scanned before the first code is scanned, execute the process represented by the process information of the second code.

4. The information processing apparatus according to claim 2, wherein the processor is configured to:
in a case where the second code is scanned before the first code is scanned, execute the process represented by the process information of the second code.

5. The information processing apparatus according to claim 3, wherein the processor is configured to:
until the first code is scanned, scan the second code added to each page, and execute each process represented by the process information of the second code.

6. The information processing apparatus according to claim 4, wherein the processor is configured to:
until the first code is scanned, scan the second code added to each page, and execute each process represented by the process information of the second code.

7. The information processing apparatus according to claim 1, wherein the processor is configured to:
in a case where another first code is scanned after the first code is scanned, set a page from a page after the first page to a page before another first page corresponding to the other first code as the process target of the process represented by the process information of the first code.

8. The information processing apparatus according to claim 2, wherein the processor is configured to:
in a case where another first code is scanned after the first code is scanned, set a page from a page after the first page to a page before another first page corresponding to the other first code as the process target of the process represented by the process information of the first code.

9. The information processing apparatus according to claim 3, wherein the processor is configured to:
in a case where another first code is scanned after the first code is scanned, set a page from a page after the first page to a page before another first page corresponding to the other first code as the process target of the process represented by the process information of the first code.

10. The information processing apparatus according to claim 4, wherein the processor is configured to:
in a case where another first code is scanned after the first code is scanned, set a page from a page after the first page to a page before another first page corresponding to the other first code as the process target of the process represented by the process information of the first code.

11. The information processing apparatus according to claim 7, wherein the processor is configured to:
in a case where the other first code is scanned after the first code is scanned, set a page after the other first page as a process target of a process represented by process information of the other first code.

12. The information processing apparatus according to claim 1, wherein the processor is configured to:
execute a process of storing image data corresponding to a page, which is a process target.

13. The information processing apparatus according to claim 12,
wherein the process information further includes storage destination information which is information representing a storage destination for storing the image data, and
the processor is configured to:
store image data corresponding to the page, which is the process target, according to the storage destination information represented by the process information.

14. The information processing apparatus according to claim 1, wherein the processor is configured to:
associate process information indicating a process to be executed with the captured document, and
display the document and the process information associated with the document.

15. The information processing apparatus according to claim 14, wherein the processor is configured to:
in a case where the process information of the first code is associated with the document including the second page, notify that the process represented by the process information of the first code is executed without executing the process represented by the process information of the second code related to the document including the second page.

16. The information processing apparatus according to claim 15, wherein the processor is configured to:
execute an alternative process different from the process represented by the process information of the second code in addition to the process represented by the process information of the first code, on the document including the second page.

17. The information processing apparatus according to claim 14, wherein the processor is configured to:
in a case where the process information of the first code is associated with the document including the second page, accept whether or not to execute a process different from the process represented by the process information of the second code related to the document.

18. The information processing apparatus according to claim 14, wherein the processor is configured to:
in a case where the process information of the first code is associated with the document including the second page, display a page, which is the second page and on which the process represented by the process information of the second code is not executed, to be distinguished from other pages.

19. A non-transitory computer readable medium storing an information processing program causing a computer to execute a process comprising:
executing, in a case where a first page to which a first code including process information, which represents information for processing a document and in which at least another page other than the first page is set as a process target, is added and a second page to which a second code including process information, which represents information for processing a document and in which the second page is set as the process target, is added are captured, a process represented by the process information of the first code without executing a process represented by the process information of the second code in a case where the process represented by the process information of the first code conflicts with the process represented by the process information of the second code.

20. An information processing method comprising:
executing, in a case where a first page to which a first code including process information, which represents information for processing a document and in which at least another page other than the first page is set as a process target, is added and a second page to which a second code including process information, which represents information for processing a document and in which the second page is set as the process target, is added are captured, a process represented by the process information of the first code without executing a process represented by the process information of the second code in a case where the process represented by the process information of the first code conflicts with the process represented by the process information of the second code.

* * * * *